E. H. HELLER.
GAGE.
APPLICATION FILED FEB. 15, 1913.
1,159,764.
Patented Nov. 9, 1915.
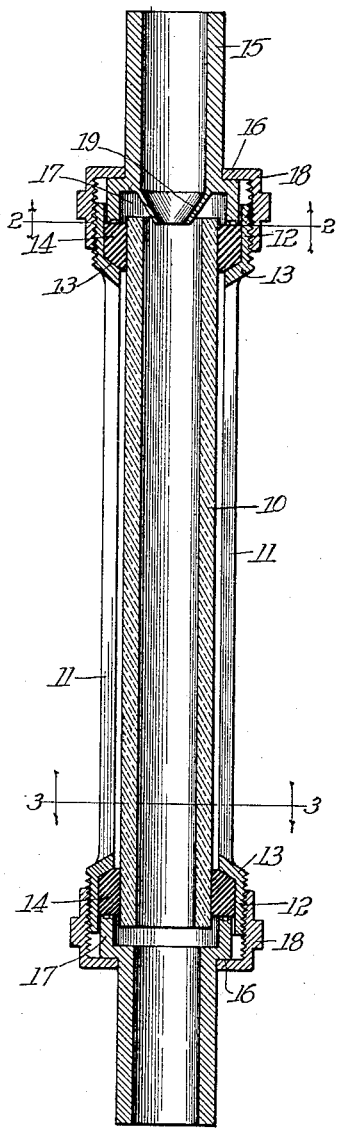
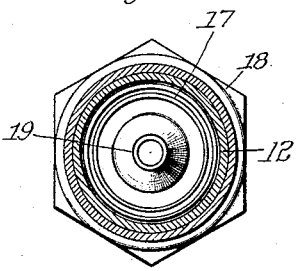
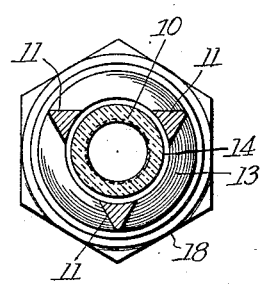

UNITED STATES PATENT OFFICE.

EUGENE H. HELLER, OF CHICAGO, ILLINOIS, ASSIGNOR TO THE HILL PUMP VALVE COMPANY, OF CHICAGO, ILLINOIS, A CORPORATION OF ILLINOIS.

GAGE.

1,159,764.      Specification of Letters Patent.      Patented Nov. 9, 1915.

Application filed February 15, 1913. Serial No. 748,576.

*To all whom it may concern:*

Be it known that I, EUGENE H. HELLER, a citizen of the United States, residing at Chicago, in the county of Cook and State of Illinois, have invented new and useful Improvements in Gages, of which the following is a full, clear, concise, and exact description, reference being had to the accompanying drawing, forming a part of this specification.

My invention relates to water glass gages for steam boilers and the like.

It has for its objects the provision of a simple and efficient apparatus for the purpose described, in which the number of parts is reduced to a minimum, the breakage of the glass tube is rendered unlikely, protection against flying glass is afforded in case of such breakage, and the glass tube is prevented from corrosion and is kept clean so that it can be easily read at any time and from any angle.

Further objects will appear from the detailed description and claims.

In the accompanying drawings one embodiment of my invention is illustrated, but it will be understood that it may take various forms, all within the scope of the appended claims.

In said drawings—Figure 1 is a longitudinal section through the axis of the gage; Fig. 2 is a cross-sectional view on the line 2—2 of Fig. 1, looking in the direction of the arrows; and Fig. 3 is a similar view on the line 3—3 of Fig. 1, looking in the direction of the arrows.

In these figures the numeral 10 indicates the glass tube, which is of the desired thickness and length, though the exact length is not essential, for, as will be explained, the construction of its connections are such that the length of the tube may vary somewhat and expansion and contraction are provided for. This glass tube is surrounded by a protecting member or casing consisting of the triangular vertical arms or bars 11, spaced a slight distance away from the outer surface of the glass. These arms are preferably integrally connected at their upper and lower ends by the exteriorly threaded cylindrical socket members 12, which are of larger diameter than the circumscribing circle of the arms 11 and are joined to said arms by the inclined portions or shoulders 13. Within these cylindrical ends 12 and bearing against the inner inclined shoulders 13 are suitable rubber or flexible washers or gaskets 14, which are preferably rectangular in cross-section in their normal form, but which when compressed in position are distorted as shown and firmly pressed against the outer surfaces of the ends of the glass. These gaskets do not bear upon the cut ends of the glass, and the latter is therefore free to expand longitudinally, and the precise length of the tube is not essential. A slight clearance exists between the bars 11 and the glass to take care of any possible expansion in that direction and to prevent any strain being put upon the glass.

The coupling member 15 at each end of the glass is provided with an exterior shoulder 16 and an inwardly extending flange 17 the edge of which engages and bears upon the rubber gasket 14. These flange edges are formed with an annular recess which insures a secure engagement and prevents any relative slipping of the bearing surfaces. An ordinary coupling nut 18 is slipped over the connecting pipe 15 and is interiorly threaded to engage the threads on the socket members 12. When these coupling nuts are tightened the flanges 17 engage the gaskets 14 and compress the same as before explained to form a tight connection with the ends of the glass tube.

The couplings 15 at the ends of the glass are of similar construction, except that the upper one is provided with an inwardly extending funnel 19, preferably formed integral with the coupling 15, and which at its lower end is of smaller diameter than the glass tube 10 and projects into the end of the same. This funnel prevents the water of condensation from dripping and running down the sides of the glass tube, thereby keeping it clean on the inside at all times and preventing the corrosion of the glass at the ends due to such drippings.

The inner sides of the supporting arms 11 are preferably silvered or otherwise whitened so as to form a background for the water level, thus insuring accurate and instantaneous readings of the glass from any angle.

I have not shown the connection of the gage with a boiler or other device with which it might be used, as such connections are well understood by those skilled in the art. It is sufficient to say that the end couplings 15 are usually connected by suitable slip nuts with the angle connections, each preferably having a valve, which connect with the boiler or other apparatus.

It will be apparent that this construction provides a simple and efficient gage. The arms 11 are of sufficient strength to preserve the ends in alinement at all times, and together with the end socket members they afford protection against flying glass in case of breakage of the tube. The glass is not likely to be broken in view of the manner in which it is supported and held, there being ample room provided for expansion and contraction of the tube. The gaskets at each end provide a tight joint with the tube and without causing strain on the glass. The cut ends of the tube do not engage either the metallic members of the socket or the gaskets, and therefore cause no strain on the tube when expanding. No metal touches the glass. The gage can be readily taken apart if it becomes necessary or desirable to remove the glass.

Having thus described my invention, what I claim as new and desire to secure by Letters Patent is—

1. In a water gage for boilers or the like, the combination with a glass tube, of a metallic protecting member surrounding the same and having a socket at each end, each said socket having an inner beveled or inclined shoulder, a flexible gasket or washer within each said socket and surrounding the end of the gage, coupling members at each end of said tube each having an exterior shoulder and a flange, said flange bearing upon the gasket and serving to compress the same, a coupling nut engaging said shoulder and being threaded upon the outside of the corresponding socket, and a funnel-shaped projection on the upper coupling member the smaller end of which is of less diameter than the glass tube whereby the drippings cannot strike the ends or inner surface of the glass tube.

2. In a water gage for boilers or the like, the combination with a glass tube, of a plurality of triangular vertical bars arranged to protect the same, the bases of said triangular bars being adjacent the glass and the apexes pointing outwardly, coupling members at each end of said tube, the upper coupling member having a contracted portion with its smaller lower end of less diameter than said tube and arranged with reference to the upper end of said tube so that the drippings cannot strike the ends or inner surface of the tube.

In witness whereof, I have hereunto subscribed my name in the presence of two witnesses.

EUGENE H. HELLER.

Witnesses:
 ROBERT LEWIS AMES,
 ANNE SOLOMON.

Copies of this patent may be obtained for five cents each, by addressing the "Commissioner of Patents, Washington, D. C."